US012541381B1

(12) United States Patent
Browder et al.

(10) Patent No.: US 12,541,381 B1
(45) Date of Patent: Feb. 3, 2026

(54) APPARATUS COMPRISING A GRAPHICAL USER INTERFACE (GUI) FOR DISPLAYING AND MODIFYING DATA ELEMENTS BASED ON USER INPUT AND LOCATION DATA

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,680

(22) Filed: Nov. 23, 2024

(51) Int. Cl.
*G06F 9/451* (2018.01)
(52) U.S. Cl.
CPC .................... *G06F 9/451* (2018.02)
(58) Field of Classification Search
CPC ........................................................ G06F 9/451
See application file for complete search history.

(56) References Cited

U.S. PATENT DOCUMENTS

| | | | |
|---|---|---|---|
| 9,055,348 B1* | 6/2015 | Kerns | H04N 21/25891 |
| 10,339,536 B2 | 7/2019 | Degeneffe et al. | |
| 10,412,556 B1* | 9/2019 | Givol | H04W 4/025 |
| 11,138,518 B1* | 10/2021 | Yu | G06F 9/44526 |
| 11,816,262 B1* | 11/2023 | Kinkade | G06F 3/013 |
| 2008/0065396 A1* | 3/2008 | Marshall | G06Q 10/10 705/16 |
| 2008/0189133 A1 | 8/2008 | Wilson et al. | |
| 2010/0131983 A1* | 5/2010 | Shannon | H04N 21/4524 725/46 |
| 2013/0218584 A1 | 8/2013 | Meier et al. | |
| 2017/0322678 A1* | 11/2017 | Silvis | G06F 3/0484 |
| 2020/0005158 A1* | 1/2020 | Kulkarni | G06F 16/24575 |
| 2021/0294582 A1* | 9/2021 | Accardo | G06N 3/08 |
| 2023/0222184 A1* | 7/2023 | Safronoff | G06F 18/2178 706/15 |
| 2024/0235956 A1* | 7/2024 | Powar | G06F 3/048 |

FOREIGN PATENT DOCUMENTS

| | | |
|---|---|---|
| CN | 113436042 A | 9/2021 |
| WO | 2001095105 A1 | 12/2001 |

\* cited by examiner

*Primary Examiner* — Tan H Tran
(74) *Attorney, Agent, or Firm* — Caldwell Intellectual Property Law

(57) ABSTRACT

An apparatus including a graphical user interface (GUI) for displaying and modifying data elements based on user input and location data, the apparatus including at least a processor; and a memory configuring the at least a processor to receive input data objects from external data sources, wherein the input data objects include structured and unstructured data, geospatial coordinates, and metadata, modify the GUI based on the received input data objects, wherein the GUI modification includes reconfiguring the GUI to modify display hierarchy of interactive elements based on the input data objects, and configure a display device, using the reconfigured GUI, to display modified interface components.

18 Claims, 8 Drawing Sheets

APPARATUS COMPRISING A GRAPHICAL USER INTERFACE (GUI) FOR DISPLAYING AND MODIFYING DATA ELEMENTS BASED ON USER INPUT AND LOCATION DATA

FIELD OF THE INVENTION

The present invention generally relates to the field of graphical user interfaces. In particular, the present invention is directed to an apparatus comprising a graphical user interface (GUI) for displaying and modifying data elements based on user input and location data.

BACKGROUND

There is a technical problem of adapting a graphical user interface (GUI) based on real-time input data, specifically geographic location data and metadata, to optimize user interaction and display. Traditional GUIs often lack the flexibility to adjust their layout and interactive elements in response to changes in location or context, leading to a static and less intuitive user experience.

SUMMARY OF THE DISCLOSURE

In an aspect, an apparatus including a graphical user interface (GUI) for displaying and modifying data elements based on user input and location data, the apparatus including at least a processor and a memory configuring the at least a processor receive input data objects from external data sources, wherein the input data objects include structured and unstructured data, geospatial coordinates, and metadata, modify the GUI based on the received input data objects, wherein modifying the GUI includes altering a spatial arrangement of display elements, including interactive controls, and data visualization components, to prioritize and present information relevant to a user's geographic location, automatically generating a sequence of command inputs that trigger context-sensitive interface routines, reconfiguring the GUI to modify display hierarchy of interactive elements based on the input data objects, wherein modifying the display hierarchy further includes utilizing a machine learning model trained on a structured dataset including location data correlated to user interaction data, wherein the machine learning model is configured to predict a relevance of interface components and adjusting a placement of graphical elements to optimize user engagement, and configure a display device, using the reconfigured GUI, to display modified interface components.

In another aspect, a method for displaying and modifying data elements of a graphical user interface (GUI) based on user input and location data, the method including receiving, by at least a computing device, input data objects from external data sources, wherein the input data objects include structured and unstructured data, geospatial coordinates, and metadata, modifying, by the at least a computing device, the GUI based on the received input data objects, wherein modifying the GUI includes altering a spatial arrangement of display elements, including interactive controls, and data visualization components, to prioritize and present information relevant to a user's geographic location, automatically generating a sequence of command inputs that trigger context-sensitive interface routines, reconfiguring the GUI to modify display hierarchy of interactive elements based on the input data objects, wherein modifying the display hierarchy further includes utilizing a machine learning model trained on a structured dataset including location data correlated to user interaction data, wherein the machine learning model is configured to predict a relevance of interface components and adjusting a placement of graphical elements to optimize user engagement, and configuring a display device, by the at least a computing device, using the reconfigured GUI, to display modified interface components.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for displaying and modifying data elements of a graphical user interface (GUI) based on user input and location data.

Aspects of the present disclosure relate to an apparatus and method for modifying a GUI based on real-time location data and external data sources, particularly for regulatory and training compliance purposes. The disclosed apparatus includes systems for collecting regulatory data, processing this data, and displaying relevant training materials through a reconfigurable GUI, which adapts based on location-specific requirements and user interaction patterns.

Exemplary embodiments illustrating aspects of the present disclosure are described below in the context of several specific examples.

Figure 1A:
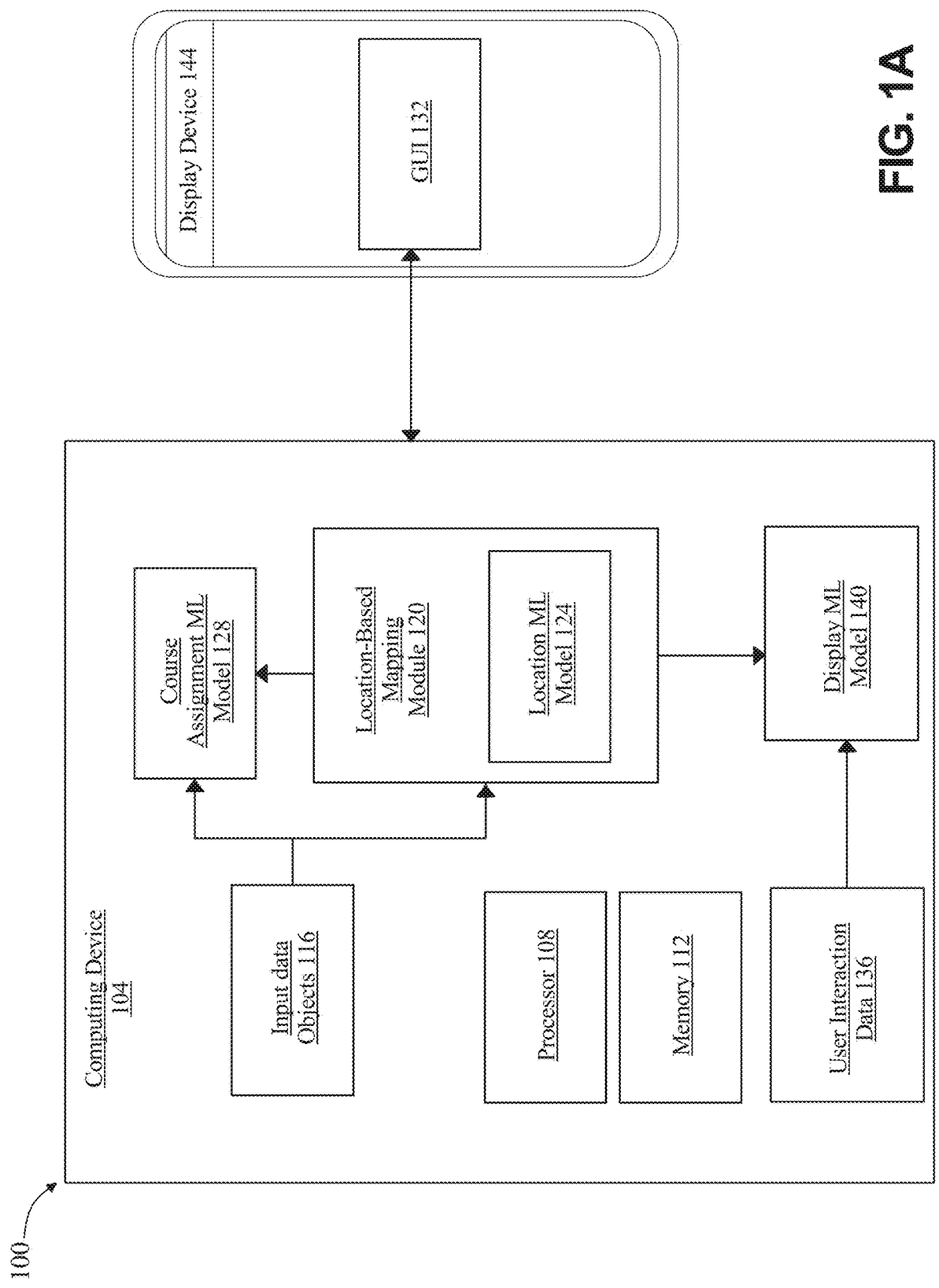
FIG. 1A is an exemplary embodiment of an apparatus comprising a graphical user interface (GUI) for displaying and modifying data elements based on user input and location data.

Referring now to FIG. 1A, an exemplary embodiment of an apparatus 100 comprising a graphical user interface (GUI) for displaying and modifying data elements based on user input and location data is illustrated. Apparatus 100 includes a computing device 104. Computing device includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1A, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. computing device 104 may be implemented, as a non-limiting example, using a "shared nothing" architecture.

With continued reference to FIG. 1A, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, processor 108 is configured to receive input data objects 116 from external data sources, wherein the input data objects 116 include structured and unstructured data, geospatial coordinates, and metadata. "Input data objects," as used herein, is data that is input into apparatus 100. Input data objects 116 may be categorized into two main types: structured and unstructured data. Structured data refers to highly organized, easily searchable data that fits into pre-defined formats like databases, spreadsheets, or tables. Examples include numerical values, alphanumeric codes (e.g., zip codes or regulatory codes), and standardized forms where fields and values are clearly delineated. Unstructured data is more complex and does not fit neatly into these formats. This may include PDFs, images, scanned documents, freeform text, and multimedia content. For instance, processor 108 may gather regulatory mandates from a government PDF file or training content from scanned hospital compliance forms. To handle this diversity, apparatus may include modules such as Optical Character Recognition (OCR) and machine vision technologies to convert unstructured data into usable, structured formats for further analysis.

Still referring to FIG. 1A, "external data sources," as used herein, refer to the locations from which the apparatus may retrieve input data objects 116. External data sources may include government websites, industry association databases, hospital portals, or other repositories of regulatory information. A data crawler may be responsible for automatically fetching the input data from these sources at regular intervals as described further below. The system's processor may be programmed to access these external resources via APIs, web scraping techniques, or data feeds, ensuring that the most current information is continuously ingested. The external sources provide critical regulatory data that varies by region, helping the system maintain compliance with the specific rules and standards that apply to different geographic areas.

Still referring to FIG. 1A, input data objects 116 may include geospatial coordinates, which may be used to pinpoint the user's location. "Geospatial coordinates," as used herein, are numerical values that designate a location. These coordinates may be obtained from GPS signals, IP address-based geolocation services, or manually entered zip codes. Geospatial data allows the apparatus to cross-reference the user's current location with the corresponding local regulations and training mandates. Processor 108 may integrate this location data with the regulatory information fetched by a data crawler, ensuring that the training modules and GUI are tailored to the user's precise geographical region. Processor 108 may receive data objects 116 including location details, such as city, state, zip code, or county, and initiate a conversion process to obtain the corresponding geospatial coordinates (latitude and longitude). To achieve this, processor 108 may send the location data to a geocoding service (e.g., a mapping API), which may return precise geospatial coordinates for the entered location. For instance, if a user provides a zip code, processor 108 may transmit this information to the geocoding service, which identifies and returns the central latitude and longitude associated with that zip code. Once processor 108 obtains the geospatial coordinates, it may integrate this location data with regulatory information fetched by the data crawler. By cross-referencing the user's precise location with local regulations and training requirements, processor 108 may configure the training modules and adjust the GUI elements to ensure they are tailored to the user's specific geographic region.

Still referring to FIG. 1A, the input data objects 116 may also include metadata, which refers to information that describes the characteristics of the data itself. For example, metadata may include the creation date of a document, the source of the data, or attributes that describe the format or language of the content. Metadata may help processor 108 to organize and filter data efficiently, allowing the system to categorize documents based on relevance, authenticity, or timeliness. For instance, metadata could be used to prioritize newer regulatory documents over outdated ones or to filter data by jurisdiction to ensure compliance with the correct set of regulations.

Still referring to FIG. 1A, receiving the input data objects 116 may include implementing a data crawler. A "data crawler," as used herein, is a program designed to automatically navigate and collect data from publicly accessible websites, such as government portals, hospital sites, and industry association databases. The data crawler may operate by scanning these websites, identifying relevant content related to regulatory requirements, and systematically extracting this information. The crawler may be configured to handle both structured data (such as HTML tables or JSON feeds) and unstructured data (such as PDFs, images, and text blocks embedded within web pages). The data crawler data may work at scheduled intervals, continuously scanning these sources to ensure that the most up-to-date regulatory data is collected. Processor 108 may configure the data crawler to initiate a web request to a target website, accessing pages that contain training regulations, compliance mandates, or policy changes relevant to specific geographic areas. Once the crawler identifies relevant sections of the site, it downloads the data for further processing. If the data is in a structured format, such as an HTML table, the crawler extracts the relevant fields directly. For unstructured formats like PDFs or images, the data is passed to apparatus's 100 OCR module for further processing. The crawler also gathers metadata (e.g., publication date, source, and jurisdiction) to ensure the data's relevance and accuracy. An OCR module may include any OCR module as described throughout this disclosure. The OCR module may analyze a document, using pattern recognition techniques to identify text embedded within an image. The OCR module may use machine learning algorithms and neural networks to enhance accuracy, especially when dealing with complex fonts, poor image quality, or variations in document formatting. For example, a PDF of a government-issued regulatory update may contain dense legal language, tables, or multi-column layouts, all of which the OCR system must accurately process to ensure no critical information is missed.

Still referring to FIG. 1A, processor 108 may categorize collected regulatory data into specific buckets corresponding to different geographical areas using a combination of classification algorithms and natural language processing (NLP) techniques. A "bucket," as used herein, is a categorized storage segment or logical grouping used to organize data based on specific attributes or classification criteria. After processor 108 receives data from the data crawler (such as regulatory updates, compliance mandates, and policy changes), it may analyze the content and assign each piece of information to a specific geographic region (e.g., state, county, or city). To achieve this, processor 108 may first inspect the metadata associated with each data object, including publication date, source, and jurisdiction tags, if available, to initially filter data by general region. For more granular categorization, processor 108 may apply NLP techniques to scan the content of the documents for region-specific keywords and phrases. These keywords might include mentions of state names, counties, cities, or local regulatory bodies (e.g., "California OSHA," "New York Health Department"). This process may enable processor 108 to refine the categorization of each document based on its geographical relevance. In cases where documents do not explicitly mention location, processor 108 may use a classifier, such as a supervised machine learning model trained on historical regulatory data, to predict the document's relevant geographical bucket. This classifier may rely on patterns within the text, such as recurring terms or legal references unique to certain jurisdictions, to determine the likely region. If the data is unstructured (e.g., PDF documents or images), processor 108 may send it to the OCR module to convert the content into a machine-readable format before applying the classification steps. The OCR module may use pattern recognition and machine learning techniques to extract text, ensuring that even complex, multi-column layouts or embedded tables are accurately interpreted for location-based categorization. After categorizing each piece of regulatory data into appropriate geographic "buckets," processor 108 may store this structured data for later retrieval, ensuring that location-specific regulations and training mandates are readily available to customize the training modules and GUI layout based on the user's specific region.

Still referring to FIG. 1A, the OCR module may perform image pre-processing, which involves enhancing the clarity and structure of the scanned document to improve the recognition process. This includes adjusting brightness, contrast, and removing any background noise or distortions that may hinder accurate text recognition. Next, the OCR system may break the document down into segments, such as blocks of text, images, tables, and headings. For text regions, the system may use character recognition algorithms to identify each letter, number, or symbol, converting it into a digital representation. The conversion process does not stop at basic text extraction; apparatus 100 via the OCR module may also interpret the structure of the document, ensuring that the layout is preserved and meaningful data, such as headings, bullet points, tables, or annotations, is correctly identified. For example, a table listing regional compliance deadlines must be recognized as a table and converted accordingly into a structured format, where each cell and its corresponding data are properly indexed. Once the text is extracted and converted, the OCR module may generate a machine-readable format, such as a structured database entry, a JSON or XML file, or a text-based document. This enables apparatus 100 to further process the data for various purposes, including mapping it to location-specific regulations, assigning training modules, or displaying it in the graphical user interface (GUI). The OCR module may also extract metadata from a document, such as the publication date, the source (e.g., the issuing regulatory body), and any geographic identifiers embedded in the content (e.g., region-specific regulations. Furthermore, the OCR module may be integrated with machine vision technology. The machine vision system may identify these non-textual elements, classifying them for further use or storing them as metadata to ensure that all aspects of the original document are preserved.

Still referring to FIG. 1A, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1A, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1A, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1A, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1A, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1A, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks.

Still referring to FIG. 1A, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1A, receiving input data objects 116 may also include processor 108 implementing Application Programming Interfaces (APIs). APIs provide a direct and efficient way to obtain structured data from trusted third-party databases or platforms. Regulatory bodies and organizations may provide APIs to allow external systems to access their databases in real-time. Processor 108 may be configured to make periodic API requests, pulling regulatory data, training requirements, and policy updates directly into the system. The retrieval process through an API may include sending a request from apparatus 100 to the external API endpoint. This request typically includes parameters, such as the specific geographic location (via geospatial coordinates) or user-specific identifiers (e.g., role or profession). The API returns data in a structured format such as JSON or XML, which processor 108 parses and integrates into its internal data repository.

Still referring to FIG. 1A, receiving input data objects 116 may also include processor 108 implementing a chatbot as described further below. The chatbot may operate within a graphical user interface the (GUI) of apparatus 100, providing a conversational interface that allows users to input specific data, ask questions related to regulatory compliance, or retrieve information from external systems, such as regulatory authorities or compliance databases. When the user engages with the chatbot embedded in the GUI, the chatbot may be configured to collect location-based data, user-specific preferences, or even regulatory information directly from the user or external data sources. For example, if a user needs to know specific training requirements for their region, the chatbot can ask the user to input their location (e.g., zip code or GPS coordinates) or additional role-related details (e.g., job function or industry). This data, once collected, is treated as an input data object, which is used by the system to tailor the GUI's content based on the relevant regulatory requirements for the user's geographic region. In addition to direct user input, the chatbot can initiate external data retrieval processes, communicating with third-party regulatory systems, databases, or APIs to gather compliance data. For instance, the chatbot may automatically request the latest regulatory updates from a government API or industry association database, then use that information to update the user's training modules within the GUI. This process allows the chatbot to act as a dynamic data collection interface, retrieving unstructured and structured data in real-time and passing it to the OCR module or machine vision technology for further processing when necessary.

Still referring to FIG. 1A, apparatus 100 may include a location-based mapping module 120 that analyzes user location (based on input such as zip code or GPS data) and matches it with the relevant regulatory data for that geographic area. A "location-based mapping module," as used herein, is a system component that processes user location data and cross-references it with regional regulatory requirements. The location mapping module may determine the specific training requirements mandated by regulatory authorities in different states, counties, or cities. The location mapping module may work in conjunction with the data crawler and input collection mechanisms (such as chatbots and APIs) to map location data with the corresponding regional regulatory requirements. The process begins when processor 108 collects location information, which can be derived from several input sources, such as the user's manually entered zip code, GPS data, or even IP-based geolocation. Once processor 108 receives the user's location data, the location-mapping module may cross-reference it with the regulatory data that has been previously gathered by the data crawler from external sources such as government websites, industry associations, and hospital portals. The regulatory data typically contains detailed training requirements and compliance mandates that vary across different states, counties, or cities. For example, healthcare workers in one state may have different continuing education requirements or certifications compared to workers in another state, due to differences in local laws and regulations. The location-mapping module may mean that the training requirements are specific to the user's location. This is accomplished by linking geographic identifiers-such as state codes, zip codes, or GPS coordinates—with the regulatory mandates stored in a database memory or databased on apparatus 100. The location mapping module may use geospatial data to filter and match the user's location with the applicable regulations in their region, ensuring that only the relevant training modules are presented to the user. For instance, a healthcare professional located in California would receive training modules that are compliant with California's specific regulatory mandates, such as continuing education requirements for license renewal or OSHA-mandated training. In contrast, a user located in New York would be assigned a different set of training modules relevant to New York's regulatory environment. Processor 108 may determine these location-specific training requirements based on input data, ensuring that users always receive the correct, regionally tailored training content.

Still referring to FIG. 1A, the location-based mapping module 120 may be designed to account for granular geographic differences. It may determine not just state-level differences but also training mandates that may vary at the county or city level. For example, certain large municipalities may impose additional compliance training that is not required at the state level. The location mapping module may be able to interpret these layers of geographic specificity, ensuring that the user is fully compliant with all applicable local, state, and federal regulations. This location-based mapping process also may ensure that apparatus 100 stays flexible and adaptive to changes in a user's location. If the user moves or changes job locations, processor 108 may re-run the mapping process using the updated geographic data and assign new training modules that reflect the regulatory requirements of the new region. By continuously analyzing and updating the geographic location of users, the apparatus maintains regulatory compliance and ensures the training modules are always up-to-date, relevant, and specific to the user's local environment.

Still referring to FIG. 1A, in addition to utilizing geospatial data and regulatory databases, the location-based mapping module 120 may also incorporate a machine learning (ML) model to optimize the accuracy and efficiency of matching user location data with relevant regulatory requirements. A location ML model 124 may be trained on a dataset that includes geospatial information correlated with historical training assignment data, regulatory updates, and user interaction patterns. This allows the location ML model 124 to learn which training modules are most likely to be required based on specific geographic inputs and past user compliance trends. The location ML model 124 may use supervised learning techniques, where the model is trained on labeled data consisting of location inputs (e.g., zip codes, GPS coordinates) and corresponding regulatory mandates from different states, counties, and cities. As the location ML model 124 processes more data over time, it becomes more efficient at predicting which training modules should be assigned to users based on their location. For example, if a user from a certain zip code in California inputs their location, the location ML model 124 can quickly infer the specific OSHA regulations or state-level healthcare mandates that apply to that area, based on patterns identified in the training data. Furthermore, the location ML model 124 is capable of handling edge cases or situations where the input location might not perfectly match existing regulatory data in the system. By analyzing similar geographic areas and correlating compliance trends, the location ML model 124 can make accurate predictions even in scenarios where direct matches are not available, ensuring that users are assigned the most relevant training modules. Processor 108 may use an algorithmic decision tree or neural network to weigh various factors—such as proximity to regulatory boundaries, user role, and industry-specific requirements—before determining the correct set of training modules.

Still referring to FIG. 1A, in scenarios where regulatory data is frequently updated, the model may also use reinforcement learning to adapt to new regulations. As processor 108 ingests new data from updates or user feedback, the location ML model 124 may refine its predictions, continually improving its ability to map user locations to the appropriate training requirements. This ensures that the training assignments remain accurate as regulatory landscapes evolve across different regions. This also enhances the overall functionality and reliability of the module, providing users with the most relevant and compliant training content for their specific geographic area.

Still referring to FIG. 1A, processor 108 may be configured to perform a course assignment function where it processes extracted regulatory data and user location to automatically assign the appropriate training modules. This process may be driven by a combination of algorithms and machine learning models designed to ensure that the assigned course modules are tailored to the user's specific geographic location, job role, and the regulatory requirements that apply to them. Processor 108 may retrieve and process location-specific regulatory data, as described above. Once the regulatory data has been extracted and linked to the user's geographic area, processor 108 may use an algorithm to match this data with the corresponding training modules in the system's course library. Processor 108 may compare the user's location (e.g., state, county, or city) against a pre-defined set of regulatory mandates stored in a database or memory of apparatus 100, ensuring that the assigned course modules align with regional training requirements. To efficiently perform this matching, processor 108 may employ a rule-based inference engine. The engine may utilize a set of predefined rules that map specific regulatory requirements to corresponding training modules. For example, if a user is located in California and works in healthcare, the system would apply rules that assign OSHA-specific training for healthcare workers in that state. These rules may be updated as the regulatory landscape changes, ensuring that users receive the most up-to-date compliance training.

Still referring to FIG. 1A, in addition to the rule-based inference engine, processor 108 may incorporate a course assignment ML model 128 to enhance the assignment process by continuously improving the precision of course module assignments based on user interaction patterns and regulatory changes. The course assignment ML model 128 may be trained on a large dataset that includes previous course assignments, regulatory data, and user completion metrics. By analyzing this data, the model learns which training modules are most relevant to different geographic locations, job roles, and user behavior. The course assignment ML model 128 may include a classification model, such as a decision tree or random forest algorithm. These algorithms may classify the user based on input data (e.g., location, job role, and past training history) and assign the appropriate course modules by predicting the user's needs based on similar past assignments. For example, if a user in a particular zip code has historically required HIPAA compliance training due to local mandates, the model would recognize this pattern and automatically assign similar training to new users in the same location. Moreover, processor 108 may also employ a recommendation engine based on collaborative filtering, similar to those used in e-commerce platforms. This recommendation system may analyze how users in similar roles or geographic regions have interacted with the training modules and uses this data to suggest the most relevant courses for new users. For example, if users in a specific city tend to complete certain safety training modules more quickly or encounter specific challenges, the system can prioritize these modules for new users in that area.

Still referring to FIG. 1A, processor 108 is configured to modify an GUI 132 based on the received input data objects 116. A "graphical user interface," as used herein, refers to the visual component of a software application that allows users to interact with the system through graphical elements, such as buttons, menus, icons, text fields, and other interactive components, rather than relying on text-based commands or code. "Graphical elements," as used herein, refer to the visual components within a GUI that may be either static or interactive, designed to enhance usability and user experience. GUI 132 acts as a dynamic platform that displays regulatory data, training modules, and user-specific content, adjusting in real-time to accommodate the user's location, role, and compliance requirements. When processor 108 receives input data objects 116—such as structured and unstructured regulatory data, geospatial coordinates, and metadata—it processes this information and reconfigures the layout and content displayed on GUI 132 in real-time. The GUI 132 refers to the underlying structure and arrangement of its elements, including menus, interactive widgets, content panels, and visual indicators. By modifying this architecture, processor 108 ensures that the most relevant information is prioritized, organized, and presented to the user based on their specific needs and regulatory requirements. For example, when the system retrieves regulatory data tied to a specific location (e.g., state-mandated training requirements), the processor may adjust GUI 132 to highlight those regulations prominently. GUI 132 may reorganize its elements to display urgent notifications, course modules that must be completed to meet local compliance standards, or additional training materials specific to the user's geographic region.

Still referring to FIG. 1A, processor 108 may also modify the interactive elements of GUI 132. This may include adjusting buttons, drop-down menus, text input fields, or other navigational elements to streamline the user's interaction with the system. For example, if a user needs to select a training module, processor 108 may change the state of certain buttons or menus to only show relevant training options based on the user's regulatory needs or previous actions. The GUI 132 may be further modified based on event-driven logic, where user actions trigger changes to the interface. "Event-driven logic," as used herein, is a programming paradigm where the flow of execution and behavior of a system are determined by events, specific actions, or occurrences detected by a system. In the context of a graphical user interface, event-driven logic may react to events like clicks, touches, keystrokes, system changes (e.g., location or time-based triggers), and adjusts the interface or system behavior accordingly. For example, when a user completes a training module, the processor might update GUI 132 to show progress indicators, unlock additional content, or display completion certificates. These event-driven changes ensure that GUI 132 remains responsive to the user's input and provides real-time feedback and updates.

Still referring to FIG. 1A, processor 108 may use machine learning models to further enhance the dynamic GUI 132. The machine learning algorithms may analyze historical data on user interactions, click patterns, and content engagement to predict which interface elements are most relevant to the user. This predictive adjustment may allow processor 108 to modify GUI 132 architecture even before the user takes action, streamlining the interaction flow and ensuring that the user has a personalized and optimized experience. For instance, if it's detected that users in a particular region tend to interact more frequently with certain training modules, processor 108 may adjust GUI 132 to display those modules more prominently for new users in the same region. Similarly, if certain tasks are commonly completed in a specific sequence, the machine learning model can reconfigure GUI 132 layout to GUI 132 the user through the same sequence, reducing the time spent navigating the interface. Additionally, processor 108 may implement an adaptive layout engine that automatically scales and adjusts GUI 132 based on the user's device type, screen size, and input method (e.g., touch or mouse). An "adaptive layout engine," as used herein, is a system component designed to automatically adjust and reorganize the structure and layout of a graphical user interface in response to various factors. This engine allows GUI 132 to remain flexible and responsive across different platforms, such as desktops, tablets, and smartphones. Processor 108 may analyze input data about the user's device (e.g., screen resolution, orientation) and modify GUI 132 architecture to ensure optimal usability. For example, on a smaller mobile device, processor 108 may condense certain elements or shift interactive components to maximize screen space, ensuring that key compliance information remains visible.

Still referring to FIG. 1A, modifying the GUI 132 includes altering a spatial arrangement of display elements, including interactive controls, content panels, and data visualization components, to prioritize and present information relevant to a user's geographic location. "Display elements," as sued herein, are components within a graphical user interface that convey information visually to the user. These can include text, images, buttons, menus, icons, and panels, all organized to provide relevant content and functionality. Altering a spatial arrangement of display elements may include methods as described above. The spatial arrangement may vary depending on factors like screen size, user preferences, and the relevance of the information to the user's location. For example, if a particular set of regulations is critical for users in a specific state or region, processor 108 may alter the layout to push those regulations to the top of the display, ensuring they are the first thing the user sees. Processor 108 analyzes the input location data, determines the most relevant information for the user, and modifies the arrangement of GUI 132 elements accordingly. In an example, the location ML model 124 may generate real-time geospatial data based on the user's zip code, GPS coordinates, or IP address. Processor 108 may use this output to determine which geographic region the user is located in and then adjusts GUI 132 to prioritize location-relevant training content and regulatory mandates. Processor 108 may continuously evaluate the most relevant data in real-time and repositions elements within GUI 132 to ensure that information critical to the user's region is prominently displayed.

Still referring to FIG. 1A, processor 108 may modify the GUI 132 to prioritize and arrange various e-learning display elements based on regulatory requirements and user needs. These display elements may include a range of components critical to the training experience, such as content panels that house specific e-learning modules like document viewers for regulatory guidelines, video viewers for instructional content, and interactive controls for navigation through quizzes and assessments. These display elements may be the course assignment output of the course assignment ML model. For instance, a content panel at the top of the interface might display a mandatory video, with a video viewer embedded for quick access, while a document viewer within an adjacent panel presents region-specific regulatory documents. In terms of interactive controls, processor 108 may adjust buttons, drop-down menus, and progress indicators to facilitate user navigation through required training modules. For example, after completing a video, the system may unlock a quiz module with interactive buttons that allow the user to start the assessment immediately. Additionally, data visualization components may be used to represent the user's progress through the training, such as a bar or pie chart that updates in real-time, showing completion percentages for each module. When prioritizing these elements, processor 108 may use location data and machine learning predictions to display the most relevant content based on common training paths in the user's region. For example, if users in a certain area typically engage with documents before taking quizzes, processor 108 may place the document viewer panel prominently, followed by the quiz module with corresponding interactive controls. This layout may ensure that GUI 132 provides an efficient, seamless training experience, with all critical e-learning elements organized and easily accessible to the user.

Still referring to FIG. 1A, processor 108 may employ a combination of layout algorithms and visual hierarchy techniques to determine how elements are arranged, focusing on prioritization and clarity. Layout algorithms are computational methods used by the processor to determine the optimal positioning of GUI 132 elements. These algorithms take into account the size, importance, and relationships between various interface components, adjusting GUI 132's layout in response to incoming data (such as user location and regulatory updates). In apparatus 100, layout algorithms may be responsible for arranging elements based on priority. Processor 108 may algorithms such as constraint satisfaction algorithms to prioritize the most important interface elements, such as buttons for starting critical compliance training, notifications for regulatory updates, or mandatory content panels. These algorithms impose constraints (e.g., required visibility, positioning at the top of the screen) and solve for the most optimal arrangement of GUI 132 elements based on the current state of the user's regulatory environment. In situations where GUI 132 needs to be updated in real-time (e.g., when a new location is detected or a new regulation is passed), greedy algorithms may be employed by processor 108. Greedy algorithms may select the highest-priority elements (e.g., a "Start Training" button or urgent compliance alert) and place them in the most prominent positions within GUI 132 (such as at the top or center of the screen). These algorithms make decisions step-by-step, selecting the most optimal position for each element based on its relative importance and the available screen space, without requiring the entire layout to be recalculated from scratch. Processor 108 may also utilize grid-based layout algorithms, which divide the screen into a grid of predefined regions or cells. Each interface element—whether it's a content panel, interactive button, or visual component—may be assigned to a specific cell based on its priority and size. For instance, a high-priority compliance notification might occupy the top-left cell (a position that typically draws the most user attention), while less important elements might be assigned to lower, peripheral cells. The grid-based layout ensures that GUI 132 remains organized and structured, even as elements are rearranged. The layout algorithm may also handle multidimensional constraints, such as screen size, device type (desktop, tablet, mobile), and the user's input method (touchscreen vs. mouse). For example, on a mobile device with limited screen real estate, the algorithm might prioritize the placement of critical compliance buttons and hide secondary elements behind collapsible menus or tooltips.

Still referring to FIG. 1A, visual hierarchy techniques are design principles that GUI may guide the user's attention to the most important elements of the interface. These techniques help the system ensure that compliance-critical information is presented prominently, while less relevant data is deprioritized or minimized. Processor 108 may adjust the visual hierarchy based on the outputs from models like the location ML model 124 and course assignment ML model 128. Processor 108 may also modify the color scheme and contrast of key elements to enhance visibility. For instance, when a regulatory update requires immediate attention, GUI 132 may render the notification in bright colors (e.g., red or yellow), while other non-critical elements are displayed in neutral tones. The contrast enhancement between high-priority elements and the rest of the interface ensures that users focus on compliance-related tasks first.

Still referring to FIG. 1A, altering interactive controls such as buttons, sliders, checkboxes, and menus may be based on the outputs from the location ML model 124 and the course assignment ML model 128. For example, when the location ML model 124 identifies that the user is in a region with specific regulatory requirements—such as mandatory OSHA training in California, the course assignment ML model 128 outputs the appropriate training modules that must be assigned to the user. Processor 108 may respond to these model outputs by adjusting the placement and visibility of relevant interactive controls. If the course assignment ML model 128 identifies that a particular course is required for compliance in the user's region, processor 108 may highlight a "Start Course" button, moving it to a more prominent location within GUI 132, and making it larger or more visually distinct. This adjustment ensures that the user can easily interact with the control that leads to the highest priority action, namely completing location-specific training. The visibility and state of other controls may be modified or deactivated based on these outputs. For instance, if a certain training module is not applicable to the user's region (as determined by the course assignment model), the associated control (e.g., a "Start Course" button) may be hidden or grayed out to prevent irrelevant actions.

Still referring to FIG. 1A, altering content panels, which display regulatory data, training progress, and compliance instructions, may be based on outputs from the location ML model 124. For instance, if a user is located in a specific state or city with unique compliance mandates, the location ML model 124 may feed this data to processor 108, which reconfigures the spatial arrangement of the content panels to present the region-specific information prominently. The course assignment ML model 128 may further inform which training modules should be prioritized in the content panels. Once processor 108 assigns the relevant course modules, it adjusts GUI 132 so that the corresponding content panel appears at the top of the interface, ensuring that critical compliance information is immediately visible. Processor 10 may use content prioritization algorithms to ensure that panels displaying the highest-priority content (e.g., mandatory courses or time-sensitive regulatory updates) are presented first, while less relevant information is deprioritized or moved to the bottom of the screen. A "content prioritization algorithm," as used herein, is a computational method used to rank and arrange elements within a graphical user interface based on their relevance, importance, and urgency. This algorithm evaluates data from various sources, such as regulatory requirements, user location, and task deadlines, assigning a priority score to each piece of content. The algorithm then modifies GUI 132 to display the most critical content (e.g., compliance notifications, training modules) in a prominent, easily accessible position, while deprioritizing or minimizing less important elements. The content prioritization algorithm may take geospatial data from the location ML model 124, which identifies the user's geographic location (such as city, county, or state) based on GPS coordinates, zip codes, or IP address. The location ML model 124 may feed this data into the algorithm, enabling it to prioritize content related to local regulatory requirements. For example, if a user is located in California, the algorithm would prioritize displaying training modules that comply with state-specific OSHA regulations over general federal training requirements. Processor 108 may also use the course assignment ML model 128 to determine the regulatory urgency for each training module. When the course assignment ML model 128 identifies a training course that is immediately required for compliance based on regulatory deadlines or recent changes, the prioritization algorithm may assign a higher ranking to that course, thus ensuring that mandatory courses are placed at the top of GUI 132, with urgent notifications (such as deadline reminders) prominently displayed to ensure user attention.

Still referring to FIG. 1A, the content prioritization algorithm may also consider user interaction patterns. Using data such as the user's progress through previous training modules, completion times, and interaction frequency, processor 108 may adjust the prioritization of elements. If a user consistently prioritizes certain types of training or tends to access specific types of information first, Processor 108 adapts by learning these patterns and automatically positioning those elements in the most accessible areas of GUI 132. The data crawler, as described above, may continuously retrieves updated regulatory information from external sources, such as government websites, healthcare portals, or industry associations. If processor 108 detects a new or updated regulation that requires immediate action, the prioritization algorithm may assign a high ranking to the corresponding content. The prioritization algorithm may also consider role-based relevance, factoring in the user's job function, responsibilities, and permissions. For example, a healthcare worker in a hospital will be assigned training modules related to patient care and safety regulations, while an administrator may see content focused on operational compliance and data privacy.

Still referring to FIG. 1A, processor 108 may employ a machine learning model to enhance the content prioritization algorithm's decision-making capabilities. By analyzing historical user data, such as clickstream behavior and course completion rates, the machine learning model may predict which elements are likely to be most relevant to the user. For instance, if a user in a specific location consistently accesses certain training modules or interacts with specific regulatory data, the model learns to automatically prioritize these elements for similar users in the same region. The machine learning model may also predict future content needs based on emerging patterns. For example, if users in a certain region typically require additional training after completing a core module, the system might automatically adjust GUI 132 to suggest the next relevant course or module before the user even requests it. These predictive capabilities further enhance the system's ability to prioritize content and tailor the user experience to their needs.

Still referring to FIG. 1A, altering data visualization components such as graphs, charts, videos, and the like may be based on the output of the location ML model 124. The location ML model 124 may feed geospatial data to processor 108, allowing GUI 132 to adjust visualizations like maps to highlight the user's specific region, bringing attention to region-specific compliance needs. For example, GUI 132 may display a heat map that shows regional training completion rates. When the location ML model 124 determines the user's specific state or city, the heat map may zoom in onto that region, visually emphasizing the relevant local data.

Still referring to FIG. 1A, prioritizing and presenting location-relevant information based on model outputs may be achieved through event-driven updates. When the location ML model 124 or course assignment ML model 128 produces a new output—such as updated regulatory requirements or newly assigned training modules—processor 108 may reconfigure GUI 132's layout in real-time. For instance, if there is a new regulatory mandate in the user's region, GUI 132 may immediately adjust to push the relevant content to the top of the screen and make urgent actions, such as starting a compliance course, easily accessible. The system ensures that content panels, interactive controls, and visual components are updated without requiring user intervention.

Still referring to FIG. 1A, modifying the GUI 132 includes automatically generating a sequence of command inputs that trigger context-sensitive interface routines. "Command inputs," as used herein, are predefined actions or instructions generated by a system to interact with and control a behavior of a graphical user interface. This may refer to processor's 104 ability to respond to user interactions and input data by generating and executing a set of predefined actions or commands. These commands may be designed to adjust the graphical user interface (GUI 132) in real-time based on the user's specific context, such as their geographic location, regulatory requirements, or interaction history. "Context-sensitive interface routines," as used herein, are automated processes within a graphical user interface that adaptively adjust the interface's behavior, layout, and displayed content in response to specific user context and system conditions. For example, when a user selects a location-based training module, processor 108 may automatically generate a sequence of commands to present the relevant content, update the user's progress, and display any compliance-related notifications. These commands trigger context-sensitive routines, which are tailored to the current state of the user's interaction. The context-sensitive routines adapt based on the data received—whether it's the user's location, their role in the organization, or regulatory changes. This ensures that GUI 132 modifies its behavior and displays the appropriate information or tasks at the right time. For instance, if processor 108 detects a regulatory update affecting the user's location, it may automatically generate a command sequence that updates the interface to reflect new compliance requirements, adjust training module assignments, and highlight relevant alerts. This dynamic and automated generation of command sequences reduces manual user input, streamlines the interaction experience, and ensures that the user is consistently presented with the most relevant tasks and information in real time. In another example, when the location ML model 124 detects that a user has moved from New York to California, the course assignment ML model 128 may identify new OSHA training requirements specific to California. Based on these outputs, processor 108 maty automatically generate a sequence of commands that update GUI 132, triggering context-sensitive routines: adjusting the layout to display the new mandatory training modules, highlighting a "Start Course" button, and generating notifications to inform the user of compliance deadlines. This ensures the user sees only location-relevant content without manual input.

Still referring to FIG. 1A, modifying the GUI 132 may include modifying the GUI 132 by modifying event-driven logic within GUI 132 to control the activation, sequence, and timing of graphical components, and adjusting visibility based on user-triggered events and predefined interaction patterns detected from the user's engagement with the interface. This may be accomplished using the methods as described above. Additionally, processor 108 may detect user-triggered events—such as clicking a button, completing a module, or scrolling through content—and uses these interaction patterns to further refine the event-driven logic. For example, if a user frequently engages with specific training modules, the event-driven logic may prioritize displaying those modules first or activating relevant notifications sooner. In some embodiments, the event-driven logic may be generated using a machine learning model trained on a dataset comprising user interaction patterns, wherein the model produces event-response triggers that are directly integrated into GUI 132's interaction framework via API function calls to control the sequence and timing of graphical component updates. This ML model may learn from how users typically interact with GUI 132, for instance, what elements they click on most frequently, the order in which they navigate through the interface, and how they respond to certain notifications or prompts. Based on these patterns, the model may generate event-response triggers, which dictate how the system reacts to specific user actions or events. For example, if the ML model has learned that users in a specific location frequently engage with certain compliance training modules after completing a particular task, it can automatically generate event-driven triggers to present those modules immediately after the relevant task is completed. These triggers are directly integrated into GUI 132's interaction framework using API function calls. These API calls instruct GUI 132 to adjust the sequence and timing of how graphical components are updated, ensuring that the user experiences a smooth, context-sensitive interface. This might involve changing which training modules are displayed, adjusting the order of notifications, or prioritizing the most relevant content based on the user's behavior and location data.

Still referring to FIG. 1A, the event-driven logic within GUI 132 may employ a rule-based inference engine combined with logistic regression to conditionally render graphical elements, wherein the event-driven logic adjusts the visibility and functionality of the graphical elements in accordance with a user permissions matrix and access levels, which are cross-referenced with location-based input data. The rule-based inference engine may use predefined logic rules that map specific conditions (such as location, user role, or permissions) to specific actions within GUI 132. This engine may determine which graphical elements should be displayed, hidden, or activated based on a user permissions matrix and access levels. The logistic regression model may help refine this decision-making by calculating probabilities based on the user's data (e.g., location, interaction patterns) to adjust the visibility and functionality of graphical components. For example, processor 108 may cross-reference the user's role (e.g., administrator, healthcare worker) and location-based data to determine which elements are accessible or visible to them. If the user's permissions or access levels change, the inference engine, guided by the logistic regression model, alters GUI 132 to reflect those changes, rendering or disabling specific elements based on real-time inputs. Together, these models may ensure that GUI 132 is responsive to the user's current context, permissions, and interaction patterns, allowing for a highly personalized and secure interface experience.

Still referring to FIG. 1, modifying the GUI 132 includes reconfiguring GUI 132 to modify display hierarchy of interactive elements based on the input data objects 116, wherein modifying the display hierarchy further includes utilizing a machine learning model trained on a structured dataset comprising geospatial coordinates correlated to user interaction data 136, wherein the machine learning model uses these correlations to predict the relevance of interface components and adjusts the placement, prominence, and visibility of graphical elements to optimize user engagement and navigation flow in real-time. A "display hierarchy of interactive elements," as used herein, refers to a structured organization of visual and interactive components within a graphical user interface. "Interactive elements," as used herein, are specific components within a GUI that users can directly manipulate or engage with to perform actions. Examples include buttons, sliders, quiz modules, video modules, checkboxes, text fields, and dropdown menus. These elements enable users to navigate, input data, and trigger commands, making the interface responsive to user input. The hierarchy may be based on their relative importance, relevance, and intended accessibility for the user. This hierarchy may determine the prominence and arrangement of buttons, menus, icons, content panels, notifications, and other elements to streamline user interaction and ensure efficient navigation. This process may include methods as described above. Processor 108 may employ a display ML model 140 trained on a structured dataset that combines geospatial coordinates with user interaction data 136, enabling the system to predict which elements are most relevant to the user at any given moment. "User interaction data," as used herein, is the information collected about how a user engages with and navigates a graphical user interface. Display ML model 140 may receive outputs from the location ML model 124, and other user interaction tracking process as described above as inputs. The model uses the structured dataset (geospatial data and interaction data) to predict the relevance of each element in GUI 132. The display ML model 140 may update its predictions based on ongoing user interactions and any updates to the input data (such as changes in location or regulatory requirements). During the training phase, processor 108 may provide the model with a labeled dataset that includes various GUI elements, user location, interaction data, and their relevance labels (e.g., high, medium, or low importance). The model learns to predict the relevance score by understanding which features contribute the most to an element's importance. For example, a training module that was completed frequently by users in a specific geographic region may be labeled as highly relevant, allowing the model to learn that location and task frequency are key predictors of relevance. The training dataset may also include historical performance data from previous users, capturing how long it took them to find relevant information or complete a task. This historical data helps the model improve its predictions for new users by drawing on past trends.

Still referring to FIG. 1A, after training, the display ML model 140 may generate a relevance score for each interactive element in GUI 132. The score may be a numeric value (e.g., between 0 and 1), representing the likelihood that a particular element will be important to the user based on the input features. The model may place higher weight on location-based inputs when regulatory information is relevant to a specific region. For instance, if the user is in a region with new compliance mandates, those regulatory updates may be assigned a high relevance score, leading to their prominence in the interface. If the user frequently interacts with compliance-related tasks, the system may assign higher relevance scores to similar tasks in future interactions. The model learns that users who engage with specific content are more likely to do so again, influencing the dynamic hierarchy of the interface. Tasks or training modules that are nearing deadlines are assigned higher relevance scores to ensure that they are highlighted prominently in the user interface.

Still referring to FIG. 1A, once the relevance scores are calculated, processor 108 may use these scores to adjust the placement, prominence, and visibility of the interface components. Elements with high relevance scores may be placed in more accessible and prominent areas of GUI 132. For instance, a training module that is mandatory in the user's current region might be moved to the top of the page, ensuring immediate visibility. High-relevance elements may be made more visually prominent by increasing their size, applying bright colors, or using visual effects (e.g., flashing notifications). This ensures that critical components stand out in the interface. Elements with low relevance scores may be deprioritized, either by reducing their visibility (e.g., making them collapsible or hiding them) or by moving them to secondary areas of the interface. The display ML model 140 continuously learns from user interactions through a feedback loop. As the user engages with GUI 132 and completes tasks, processor 108 records this interaction data, which is then fed back into the model to refine its predictions. This process ensures that the relevance score calculations remain accurate and adaptive to the user's changing behavior and needs over time. For example, if the system notices that a user starts interacting with new types of content (e.g., regulatory updates from a different region), the model will adjust the relevance scores for similar future content. This real-time feedback loop allows the system to optimize the user experience continuously.

Still referring to FIG. 1A, the adjustment of graphical component visibility may be executed through a display management system that applies HTML and CSS function calls to toggle the visibility of interface elements, wherein the adjustments are directly controlled by event-driven logic in response to real-time user input and predefined interaction patterns. This may include implementing methods as described above. For example, when the location ML model 124 identifies that a user is in a region where specific compliance actions are mandatory, the event-driven logic activates the corresponding compliance-related GUI 132 elements. This may include displaying a "Start Training" button or highlighting a compliance alert related to location-specific regulations. Processor 108 may use this logic to ensure that the user is always presented with the most relevant interface elements based on their geographic location and current interaction context. In modern web-based interfaces, HTML (Hypertext Markup Language) is used to structure the content, while CSS (Cascading Style Sheets) controls the visual presentation, such as colors, fonts, layout, and visibility. By using these technologies, processor 108 can adjust which elements are shown or hidden based on user interactions, location-specific data, or event-driven logic. In the context of a modified GUI 132, HTML may define the structural elements of the interface, such as buttons, forms, panels, and other interactive controls. CSS, on the other hand, defines how these elements appear-controlling aspects like size, color, spacing, and visibility. By manipulating the HTML and CSS in real-time, the system can adjust the interface's layout and content presentation in response to changes in the user's context or behavior. For instance, if a user completes a particular task or enters a new geographic location, GUI 132 may hide certain elements (such as outdated forms or irrelevant content) and display new ones (such as location-specific compliance tasks) without needing to reload the entire interface. This is achieved through HTML and CSS function calls, which are essentially commands that adjust the presentation of specific elements based on event triggers. CSS allows for the dynamic toggling of an element's visibility through several key properties, such as display, visibility, and opacity. By using CSS function calls, GUI 132 can seamlessly transition between these visibility states. For example, when the location ML model 124 detects a change in the user's geographic region, processor 108 can make a CSS call to hide irrelevant compliance modules and show new content tailored to the user's new location. Processor 108 may use event-driven logic to decide when to toggle the visibility of certain elements. Events could be triggered by user actions (e.g., clicking a button, completing a training module) or by system-detected changes (e.g., new compliance regulations or a location change). These events may trigger JavaScript functions that make HTML and CSS calls, allowing the interface to adjust in real-time without needing a page refreshment.

Still referring to FIG. 1A, in some embodiments, GUI 132 may include an audiovisual control module configured to utilize event-driven logic to manage the activation of multimedia elements, wherein the multimedia elements are activated in a predefined order based on user-triggered events and the location-specific relevance of the content. This may include a part of the graphical user interface responsible for controlling the display and sequence of multimedia content, such as videos, audio clips, or interactive tutorials. This module works by leveraging event-driven logic to trigger the activation of multimedia elements based on specific user interactions and the relevance of the content to the user's geographic location and context. The audiovisual control module within GUI 132 may be designed to manage and sequence multimedia elements in real-time. This may be done by relying on event-driven logic, which, as previously discussed, is responsible for responding to user interactions and adjusting the interface accordingly. In this case, the event-driven logic activates multimedia content in response to user actions, such as completing a particular task, clicking a button, or entering a new location. For example, if the location ML model 124 detects that the user is in a region where a specific training video is required for compliance (such as California OSHA training), the event-driven logic will activate the corresponding video or audio element. This activation is controlled by predefined rules that ensure the relevant multimedia elements are presented in the correct sequence. The predefined order of multimedia elements may be determined based on both user-triggered events and the relevance of the content to the user's specific location or interaction history. For instance, a user might complete a compliance training module, which then triggers the next multimedia element, such as a region-specific video tutorial. Processor 108 may activate these elements in a logical flow, ensuring that the content is delivered in a way that aligns with both regulatory requirements and the user's progress. This sequencing may be determined by the event-driven logic, which uses the user's interactions and location-based data as inputs to decide when and in what order multimedia elements should be presented. The event-driven logic may work in tandem with a rule-based inference engine (previously discussed), where predefined conditions (e.g., the user completing a training module, entering a specific location) trigger specific audiovisual content. The logic ensures that the sequence of multimedia activation is context-sensitive, delivering information that is immediately relevant to the user's compliance needs. Additionally, apparatus 100 may use lazy-loading techniques to only activate multimedia elements when they are needed, based on the real-time event triggers generated by user interactions.

Still referring to FIG. 1A, in some embodiments, GUI 132 may include a notification management module configured to generate, prioritize, and display alerts based on a decision-tree algorithm that ranks the relevance and urgency of location-based data updates, wherein the decision-tree algorithm assigns a priority score to each notification, automatically positioning the highest-priority alerts at the top of the display hierarchy. The notification management module may refer to a component of apparatus 100 that handles the generation, ranking, and display of alerts within GUI 132. It works by analyzing data from various sources, including regulatory updates and location-based information, and then deciding which alerts are most critical to the user. The purpose of this module is to ensure that users are always informed of the most urgent and relevant updates without being overwhelmed by less important notifications. For example, if a new regulatory update is issued for a specific region, the notification management module may generate an alert and determine how urgent and relevant this update is for the user based on their location, role, and current tasks. GUI 132 will then position this alert appropriately within the interface, ensuring that critical updates are seen immediately, while less urgent notifications are displayed in secondary positions or hidden altogether. A decision-tree algorithm may work by breaking down the decision-making process into a tree-like structure, where each node represents a condition or factor that affects the notification's priority score. For example, the algorithm may first check the user's geographic location using data from the location ML model 124. If the notification pertains to a new regulation that specifically applies to the user's region, the decision-tree assigns a higher score to that notification. The next level of the decision tree may evaluate the urgency of the notification. Time-sensitive alerts, such as upcoming compliance deadlines, are given higher priority. Another factor the algorithm may consider is the user's past interaction behavior. The decision-tree algorithm may identify which types of notifications the user typically engages with and assigns higher priority to similar alerts. For instance, if the user regularly interacts with regulatory compliance updates, those types of notifications will receive a higher score in the future.

Still referring to FIG. 1A, by processing these conditions in sequence, the decision-tree algorithm may generate a priority score for each notification. This score determines how the system will position the alert within the display hierarchy of GUI 132. Processor 108 may adjust the display hierarchy of GUI 132 to reflect these scores. Notifications with the highest priority—such as urgent regulatory updates or immediate compliance deadlines—may be positioned at the top of the interface. These high-priority alerts may be highlighted visually, using larger fonts, bold colors, or pop-up banners, ensuring they capture the user's attention immediately. Lower-priority notifications, on the other hand, may be displayed further down the interface or grouped into collapsible sections. Processor 108 may use the priority score generated by the decision-tree algorithm to continuously rearrange the notifications as new updates come in. For example, if a new location-specific regulation is issued, processor 108 may automatically reposition an existing notification lower in the hierarchy to make room for the more critical update at the top. The event-driven logic may ensure that these notifications are updated in real-time, without requiring manual input from the user. As soon as a high-priority alert is generated, GUI 132 adjusts to reflect the new information, maintaining a user-friendly interface that highlights the most important actions.

Still referring to FIG. 1A, GUI 132 may include a multi-touch gesture recognition system utilizing a convolutional neural network (CNN) to detect and interpret touch gestures, wherein the CNN adjusts the scaling, panning, and reorientation of location-specific data visualization components based on real-time user touch inputs. A multi-touch gesture recognition system may allow GUI 132 to interpret multiple points of contact on a touch screen simultaneously. This enables the detection of complex user interactions such as pinching to zoom, swiping to navigate, and rotating to change orientation. The CNN plays a role in detecting and interpreting these gestures by learning from patterns in user touch inputs and distinguishing between different types of interactions. For example, if the user is viewing a map or a chart that displays regulatory compliance data for their geographic location, GUI 132 may allow them to zoom in or out, pan across regions, or rotate the display based on touch gestures. The CNN processes the input from a user device's touch sensors, recognizing distinct touch gestures based on the spatial relationships between multiple touch points (e.g., fingers on the screen). The CNN may be trained on a dataset containing examples of common multi-touch gestures, such as pinching, swiping, and rotating. Once the CNN detects a specific gesture, processor 104 may adjusts the data visualization components in real-time. When the user performs a pinching gesture, the CNN interprets this as a zoom command, either enlarging or reducing the size of the data visualization. For instance, if the user is looking at a compliance heatmap for a region, the system can zoom in on specific areas to provide more detailed data or zoom out to show a broader overview. Swiping gestures allow the user to pan across the interface, which is especially useful for navigating large datasets or maps that cover multiple regions. The CNN detects the direction and velocity of the swipe, and processor 108 adjusts the visualization accordingly, allowing the user to smoothly navigate from one area to another. Rotational gestures can change the orientation of data visualizations, such as rotating a 3D map or chart. The CNN processes the rotational movement and adjusts the orientation of the visualization so the user can view the data from different angles.

Still referring to FIG. 1A, the multi-touch gesture recognition system may be integrated with the location ML model 124, which determines the relevance and structure of the location-specific data visualizations displayed in the interface. For instance, if a user is viewing compliance data or regulatory maps that are tied to their specific geographic location, processor 108 allows them to interactively explore this information using touch gestures. For example, the user might zoom in on a specific city or region to see detailed regulatory requirements or swipe through different counties to compare compliance metrics. The CNN ensures that these interactions are seamless, providing an intuitive way to explore complex, location-specific data without the need for external input devices like a mouse or keyboard. Additionally, the event-driven logic of GUI 132 may allow processor 108 to adjust the interface based on the user's interaction. If the user zooms in on a specific region using a pinch gesture, the event-driven logic ensures that additional relevant information (such as regulatory updates or compliance tasks) is displayed.

Still referring to FIG. 1A, in some embodiments, GUI 132 may include, an adaptive layout engine integrating a device-detection module driven by a k-nearest neighbors (KNN) classification algorithm to identify a screen type and resolution of a user's device, wherein the KNN algorithm triggers responsive layout adjustments, automatically reconfiguring GUI 132's structure. The adaptive layout engine may be configured to ensure that GUI 132 remains responsive and user-friendly across various devices with different screen sizes and resolutions. This engine may integrate a device-detection module that leverages machine learning algorithms, specifically the K-nearest neighbors (KNN) algorithm, to classify the user's device and trigger the necessary layout adjustments. For instance, the layout of a compliance dashboard or training module might be structured differently for a mobile device versus a desktop computer, allowing users to interact with the content in the most efficient and user-friendly way. The KNN algorithm may include a supervised machine learning model that classifies data points by comparing them to a dataset of known classifications. In this case, processor 108 may use KNN to classify devices based on factors such as screen resolution, screen size, input method, operating system, and the like. The KNN algorithm may compare the user's device characteristics against a pre-labeled dataset containing different device types (e.g., smartphones, tablets, desktops). The algorithm may then determine the k-nearest neighbors—the closest matching devices in the dataset—and classifies the current device based on those neighbors. For example, if a user's device has a screen resolution and size similar to a tablet in the dataset, the algorithm will classify it as a tablet, triggering the system to load a tablet-optimized layout for GUI 132.

Still referring to FIG. 1A, once the KNN algorithm has classified the device, it may trigger responsive layout adjustments in GUI 132. These adjustments may be automatically applied by the adaptive layout engine to ensure the interface is structured appropriately for the device type. The key aspects of the layout that are modified include rearrangement of user interface elements, scaling of fonts and graphical components, reorientation and optimization of visual content, and the like. For example, for smaller screens (e.g., smartphones), GUI 132 may stack interactive elements vertically to make them easier to access. For larger screens, such as desktops or tablets, the layout may spread elements out horizontally, making better use of the available screen space. As mentioned previously, event-driven logic helps trigger changes in GUI 132 based on user interactions or environmental factors. Here, the event-driven logic may monitor changes in the screen size or device type (such as switching from a tablet to a desktop) and works in tandem with the KNN algorithm to trigger responsive layout adjustments in real time.

Still referring to FIG. 1A, in some embodiments, GUI 132 may incorporate a reinforcement learning model trained on user interaction datasets to iteratively optimize the layout and interaction flow, wherein the reinforcement learning model continuously refines the arrangement and prioritization of graphical elements in response to patterns detected from location-based inputs. "Reinforcement learning (RL)," as used herein, is a type of machine learning where an agent learns to make decisions by interacting with an environment. In the context of GUI 132, the RL model functions as the decision-making agent that continuously learns from the user's interactions with the interface. The model's goal is to maximize a reward, which could represent improved user engagement, task completion speed, or user satisfaction. The environment here is the user's interaction with the graphical elements of the interface, such as clicking buttons, completing tasks, or navigating through compliance modules. The model receives feedback from these interactions (such as how quickly the user completes a task or whether they ignore certain elements) and uses this feedback to iteratively improve the interface layout. This dynamic adjustment process allows the system to continually optimize the user experience by making the layout more efficient and tailored to the user's needs. The RL model may be trained on user interaction datasets, which include detailed information about how users engage with GUI 132 over time. These datasets may capture metrics such as click pattern, time spent on specific elements, task completion metrics, navigation flow and the like. The reinforcement learning model may not only be trained on general user interaction data 136 136 but also may incorporate location-based inputs to further refine the layout. Location data, provided by the location ML model 124, helps the system tailor GUI 132 to the user's geographic context, ensuring that the interface reflects region-specific compliance requirements and priorities. For example, users in different regions may have distinct regulatory obligations. The RL model may detect these patterns and adjusts the layout to prioritize location-relevant tasks. For instance, a user in California might need quick access to specific OSHA compliance forms, while a user in New York might require different resources. The model may use this location data to adjust GUI 132 layout in real-time, making sure that the most important tasks based on the user's geographic location are readily accessible.

Still referring to FIG. 1A, processor 108 is further configured to configure a display device 144 (e.g., user device), using the reconfigured GUI 132, display modified interface components. When the reinforcement learning model optimizes the layout based on user interaction patterns or the event-driven logic detects a significant change (such as location or task completion), the processor 108 may reconfigure GUI 132 accordingly. This reconfigured GUI 132, which has updated components (such as relocated buttons, adjusted sizes, or prioritized elements), is then displayed on the user's device—whether it's a smartphone, tablet, or desktop. The adaptive layout engine mat that these modified components are displayed optimally for the user's device type, with the appropriate scaling and arrangement handled by the KNN-based device detection system. This seamless, real-time configuration of the display device 144 ensures the user has an interface that is visually clear, relevant, and responsive, enhancing their interaction with location-specific data or tasks.

Figure 1B:
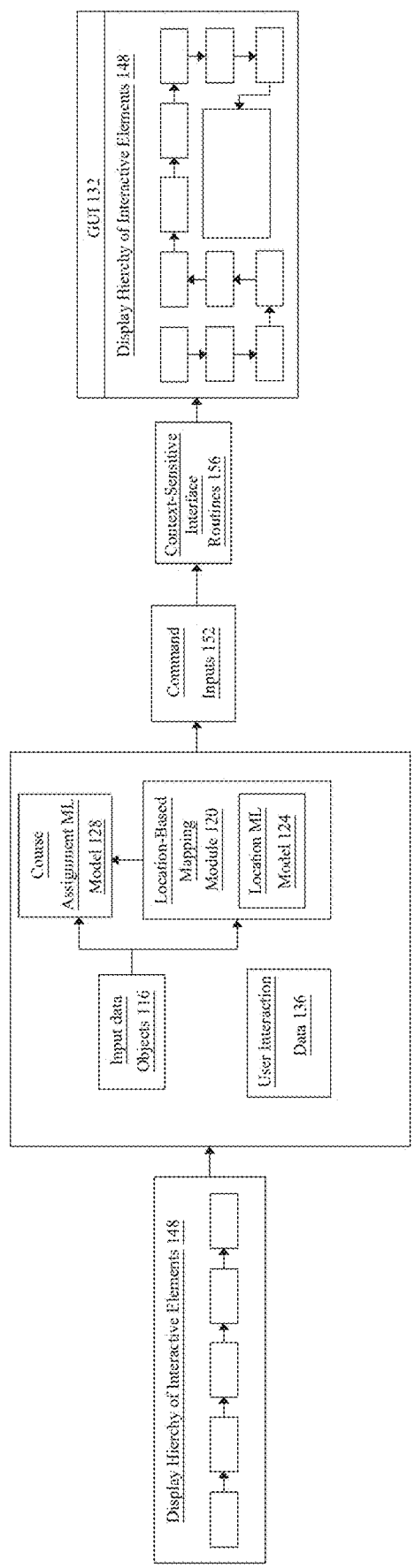
FIG. 1B is an exemplary flow chart of dynamic modification to the architecture of a GUI.

Referring now to FIG. 1B, an exemplary flow chart of dynamic modification to the architecture of a GUI is illustrated. System components include system components as described in FIG. 1A. A display hierarchy of interactive elements 148 may be modified based on outputs of location-based mapping module 120, user interaction data 136, and the like as described above, by way of processor 108 command inputs 152 in order to generate context-sensitive interface routines 156 that alter the ranking, context, and arrangement of display elements, interactive elements, and the like as described thought this disclosure.

Figure 2:
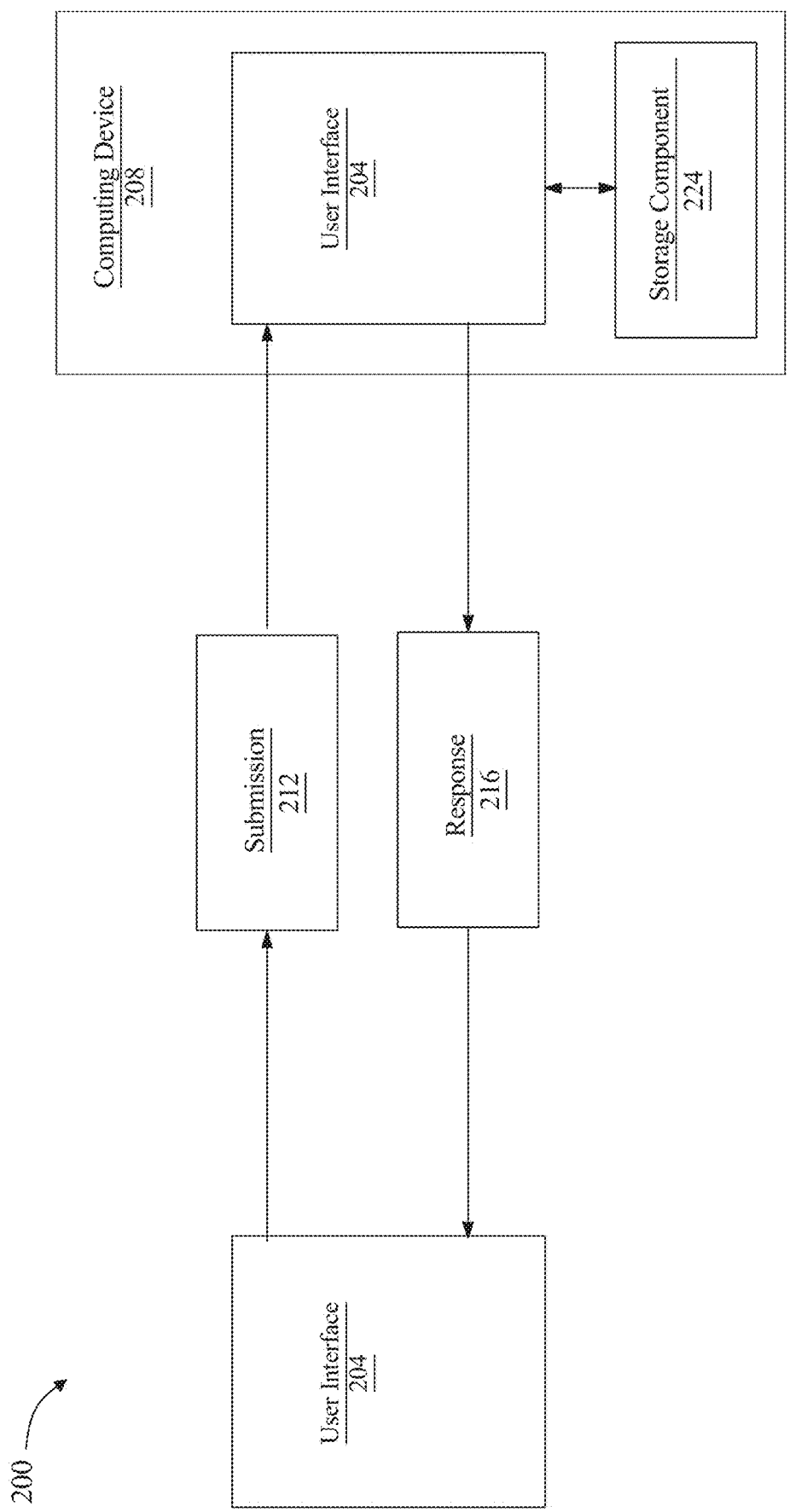
FIG. 2 is a block diagram of exemplary embodiment of a chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively, or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively, or additionally, in some cases, one or both of submission 212 and response 216 are audio-based communication.

Continuing in reference to FIG. 2, a submission 212 once received by computing device 208 operating a chatbot, may be processed by a processor 108. In some embodiments, processor 108 processes a submission 212 using one or more of keyword recognition, pattern matching, and natural language processing. In some embodiments, processor employs real-time learning with evolutionary algorithms. In some cases, processor 108 may retrieve a pre-prepared response from at least a storage component 224, based upon submission 212. Alternatively or additionally, in some embodiments, processor 108 communicates a response 216 without first receiving a submission 212, thereby initiating conversation. In some cases, processor 108 communicates an inquiry to user interface 204; and the processor is configured to process an answer to the inquiry in a following submission 212 from the user interface 204. In some cases, an answer to an inquiry present within a submission 212 from a user device 204 may be used by computing device 104 as an input to another function, for example without limitation at least a feature or at least a preference input.

Figure 3:
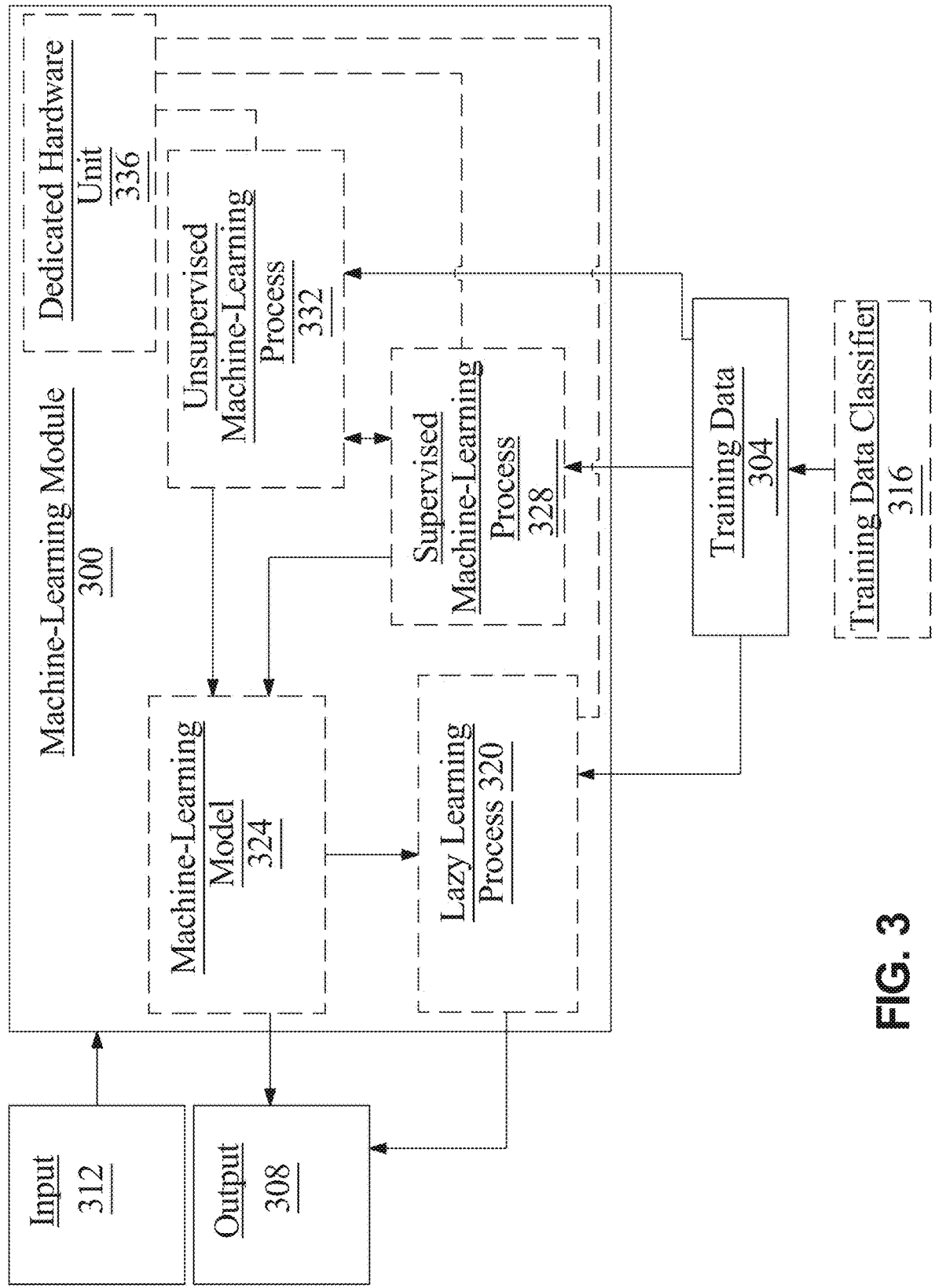
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to geographic regions, compliance roles, job categories, or user interaction patterns, and/or other analyzed items such as a cohort of users who frequently engage with safety training modules within a specific timeframe, and/or phenomena related to patterns of interaction during compliance training for medical professionals in urban versus rural locations.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may ve performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
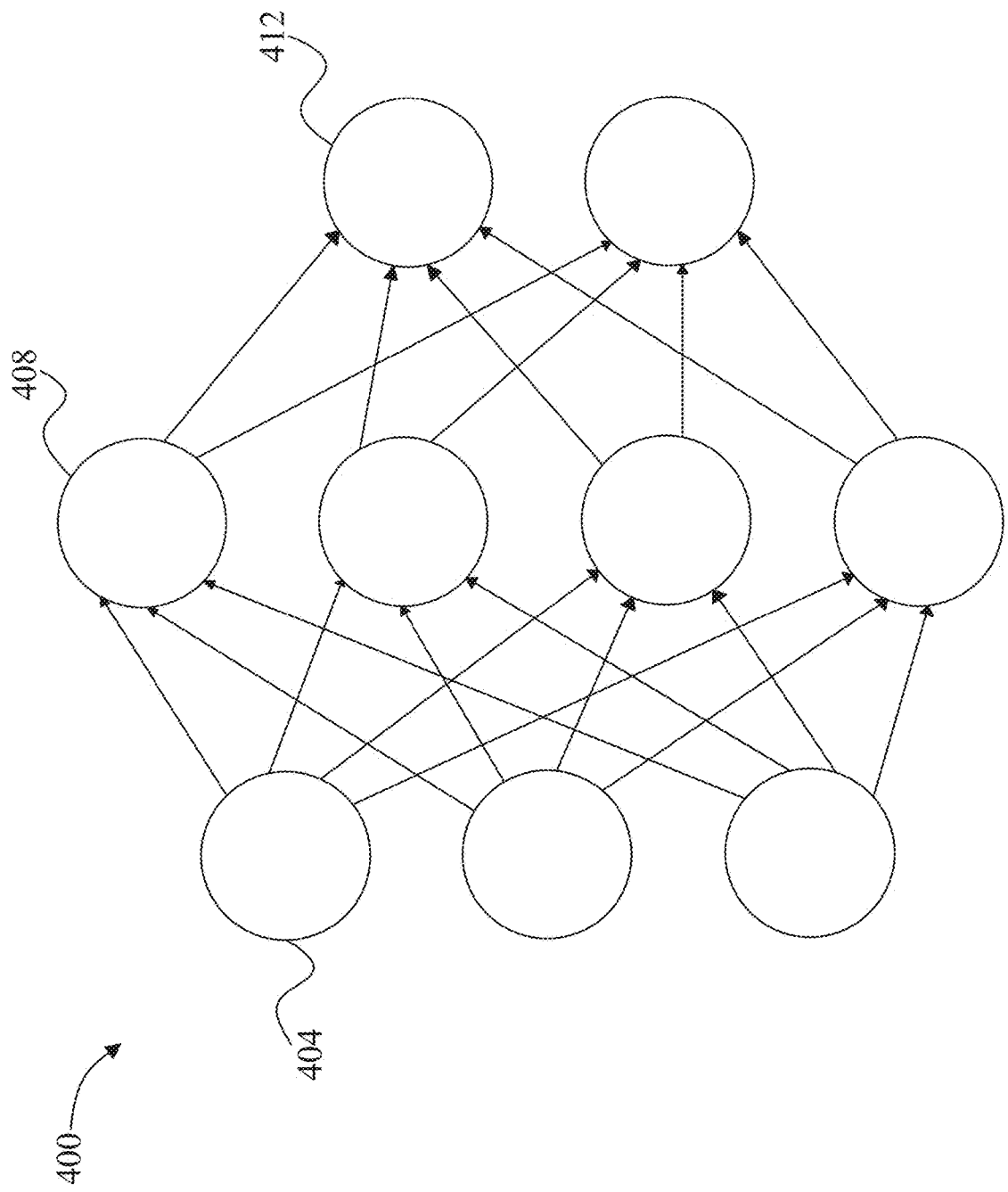
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
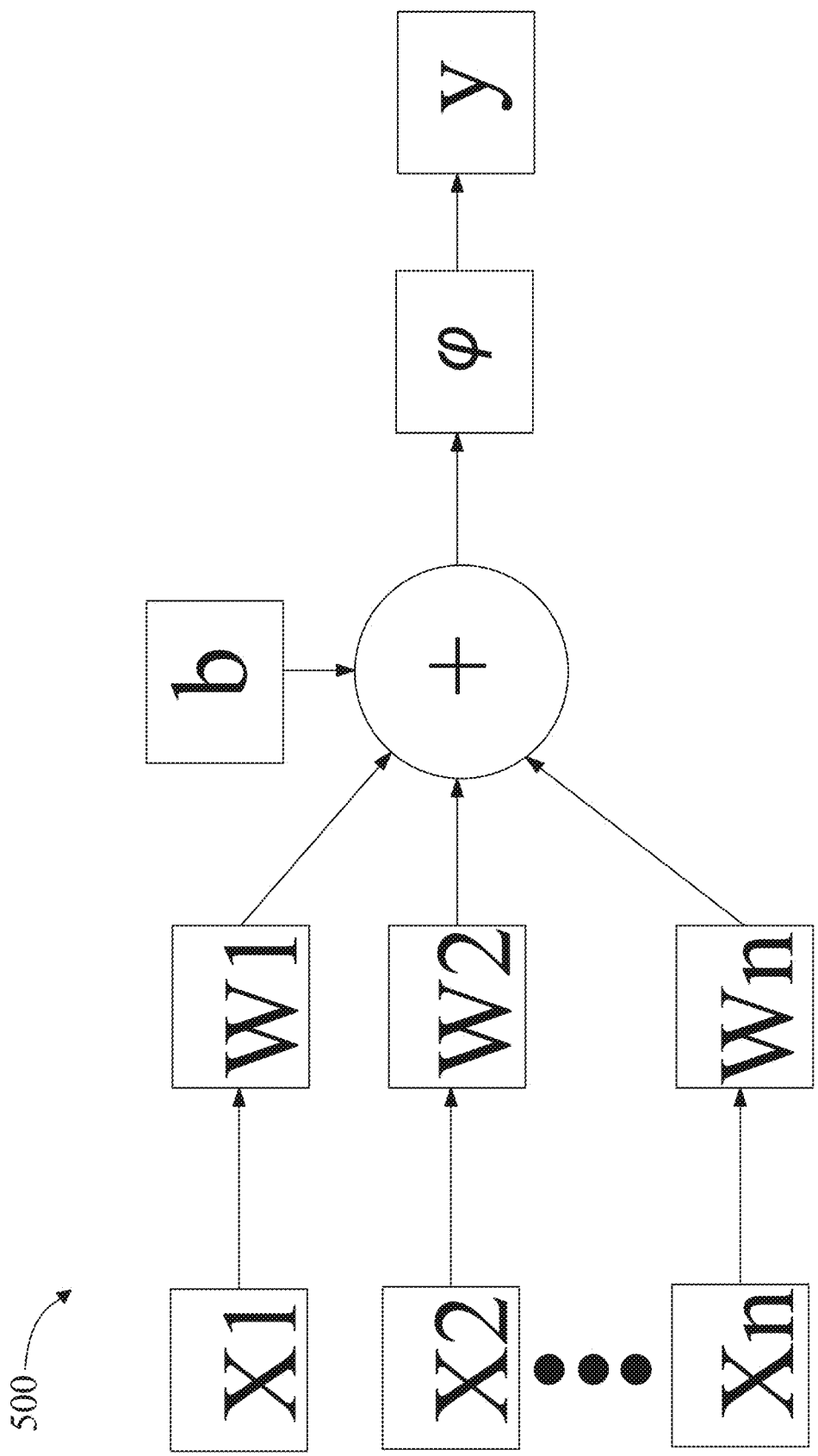
FIG. 5 is a block diagram of an exemplary embodiment of a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
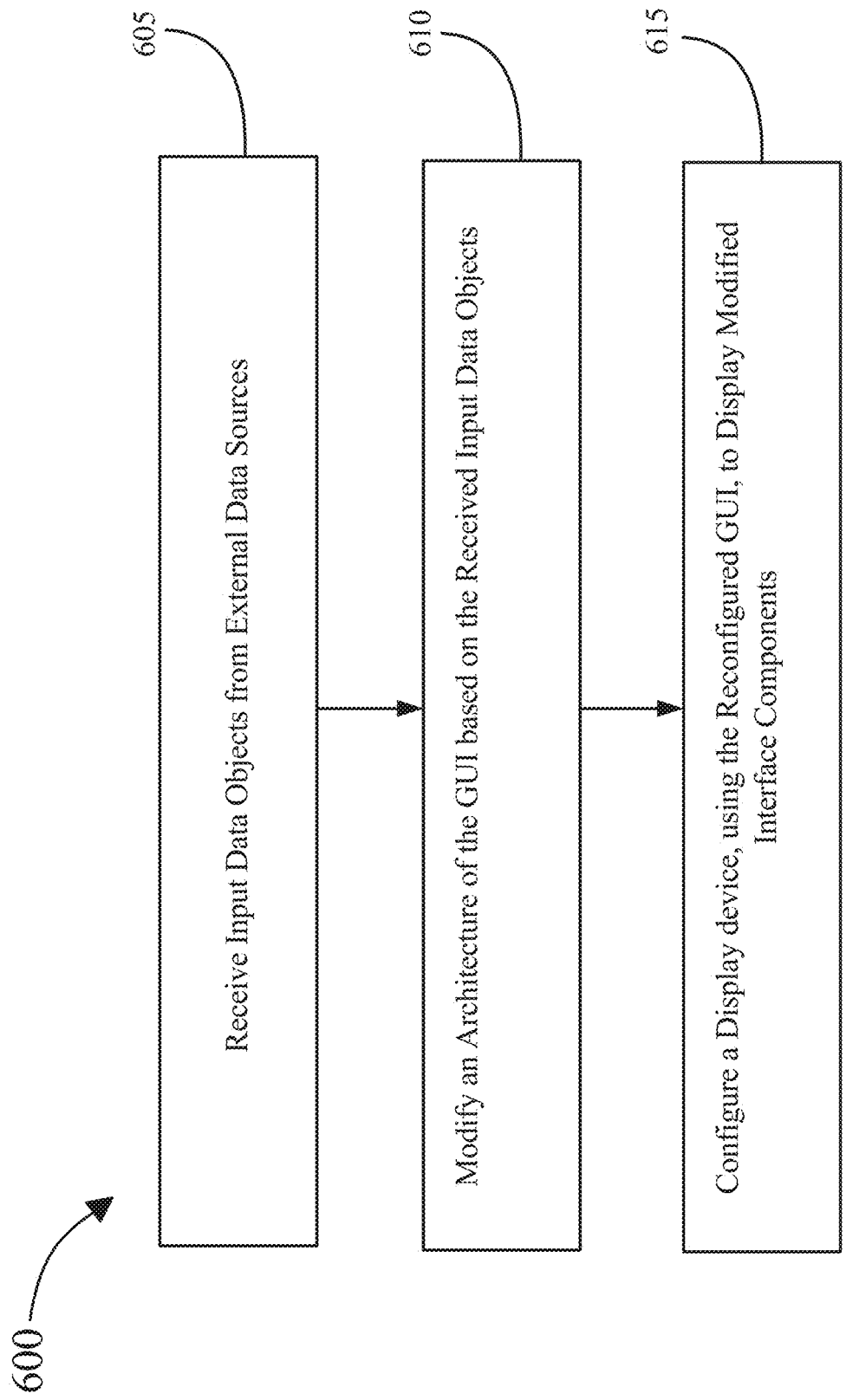
FIG. 6 is an exemplary flow chart of a method for displaying and modifying data elements of a graphical user interface (GUI) based on user input and location data.

Now referring to FIG. 6 an exemplary flow chart of a method 600 for displaying and modifying data elements of a graphical user interface (GUI) based on user input and location data is illustrated. At step 605, method 600 includes receiving, by at least a computing device, input data objects from external data sources, wherein the input data objects include structured and unstructured data, geospatial coordinates. This may include methods as disclosed in FIGS. 1-5. At step 610, method 600 includes modifying, by the at least a computing device, the GUI based on the received input data objects. This may include methods as disclosed in FIGS. 1-5. The GUI modification includes altering a spatial arrangement of display elements, including interactive controls, and data visualization components, to prioritize and present information relevant to a user's geographic location. The GUI modification includes automatically generating a sequence of command inputs that trigger context-sensitive interface routines. The GUI modification includes reconfiguring the GUI to modify display hierarchy of interactive elements based on the input data objects, wherein modifying the display hierarchy further includes utilizing a machine learning model trained on a structured dataset including location data correlated to user interaction data, wherein the machine learning model is configured to predict a relevance of interface components and adjusting a placement of graphical elements to optimize user engagement. At step 615, method 600 includes configuring a display device, by the at least a computing device, using the reconfigured GUI, to display modified interface components. This may include methods as disclosed in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
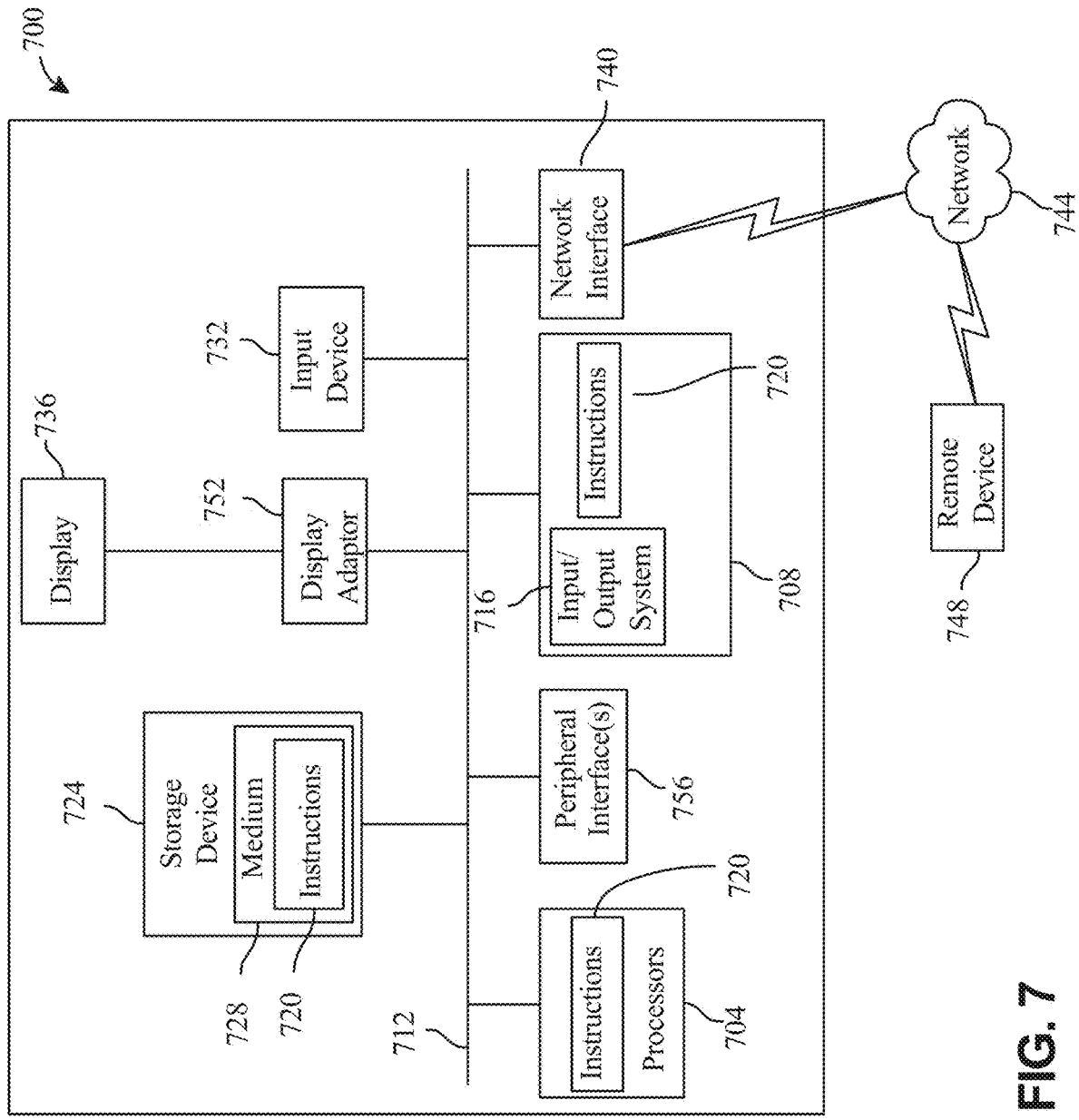
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus comprising a graphical user interface (GUI) for displaying and modifying data elements based on user input and location data, the apparatus comprising:
   at least a processor; and
   a memory configuring the at least a processor to:
      receive input data objects from external data sources, wherein the input data objects include structured and unstructured data, geospatial coordinates, and metadata;
      modify the GUI based on the received input data objects, wherein modifying the GUI comprises:
         altering a spatial arrangement of display elements to present information relevant to a user's geographic location;

automatically generating a sequence of command inputs that trigger context-sensitive interface routines;
reconfiguring the GUI to modify display hierarchy of interactive elements based on the input data objects, wherein modifying the display hierarchy further comprises:
utilizing a machine learning model trained on a structured dataset comprising location data correlated to user interaction data, wherein the machine learning model is configured to predict a relevance of interface components; and
adjusting a placement of graphical elements to optimize user engagement;
generate, using the machine learning model, a relevance score for each interactive element in the GUI, wherein the relevance scores are based at least in part on:
at least one newly introduced compliance mandate based on a current location of a user; and
a frequency of interaction of the user with compliance-related tasks; and
configure a display device, using the reconfigured GUI and each relevance score, to display modified interface components, wherein the relevance scores are used to further adjust the placement, prominence, and visibility of the interface components.

2. The apparatus of claim 1, wherein receiving the input data objects from the external data sources comprises implementing a data crawler configured to:
initiate a web request based on a geographic location; and
identify relevant content related to regulatory requirements corresponding to the geographic location.

3. The apparatus of claim 1, wherein receiving the input data objects from the external data sources comprises implementing an application programming interface (API), wherein the at least a processor sends a request to an API endpoint based on the geospatial coordinates.

4. The apparatus of claim 1, wherein the at least a processor is further configured to match a location to regulatory data using a location-based mapping module configured to:
receive the input data objects;
input identified geospatial coordinates of the input data objects into a location machine learning (ML) model; and
output corresponding regulatory requirements.

5. The apparatus of claim 1, wherein the at least a processor is further configured to perform a course assignment function using a course assignment machine learning (ML) model configured to:
receive the input data objects;
receive location-specific regulatory data of a location-based mapping module; and
classify the input data objects a to course assignment based on the location-specific regulatory data.

6. The apparatus of claim 1, wherein modifying the GUI comprises implementing a layout algorithm, comprising at least a grid-based layout algorithm, to determine the arrangement of display elements and interactive elements of the GUI.

7. The apparatus of claim 1, wherein the at least a processor is further configured to implement a notification management module configured to:
generate a plurality of display alerts;
employ a decision-tree algorithm to rank the plurality of display alerts; and
display the ranked display alerts through the GUI.

8. The apparatus of claim 1, wherein the at least a processor is further configured to implement an audiovisual control module configured to utilize event-driven logic to manage an activation of multimedia elements through the GUI, wherein the multimedia elements are activated in a predefined order based on user-triggered events and a location-specific relevance of content.

9. The apparatus of claim 1, wherein the adjustment in placement of the interface components is executed through a display management system that is configured to apply function calls to toggle a visibility of interface elements, wherein the adjustments are directly controlled by event-driven logic in response to real-time user input and predefined interaction patterns.

10. A method for displaying and modifying data elements based on user input and location data through a graphical user interface (GUI), the method comprising:
receiving, by at least a computing device, input data objects from external data sources, wherein the input data objects include structured and unstructured data, geospatial coordinates, and metadata;
modifying, by the at least a computing device, the GUI based on the received input data objects, wherein modifying the GUI comprises:
altering a spatial arrangement of display elements to present information relevant to a user's geographic location;
automatically generating a sequence of command inputs that trigger context-sensitive interface routines;
reconfiguring the GUI to modify display hierarchy of interactive elements based on the input data objects, wherein modifying the display hierarchy further comprises:
utilizing a machine learning model trained on a structured dataset comprising location data correlated to user interaction data, wherein the machine learning model is configured to predict a relevance of interface components; and
adjusting a placement of graphical elements to optimize user engagement;
generating, by the at least a computing device using the machine learning model, a relevance score for each interactive element in the GUI, wherein the relevance scores are based at least in part on:
at least one newly introduced compliance mandate based on a current location of a user; and
a frequency of interaction of the user with compliance-related tasks; and
configuring a display device, by the at least a computing device, using the reconfigured GUI and each relevance score, to display modified interface components, wherein the relevance scores are used to further adjust the placement, prominence, and visibility of the interface components.

11. The method of claim 10, wherein receiving the input data objects from the external data sources comprises implementing a data crawler configured to:
initiate a web request based on a geographic location; and
identify relevant content related to regulatory requirements corresponding to the geographic location.

12. The method of claim 10, wherein receiving the input data objects from the external data sources comprises implementing an application programming interface (API), wherein the computing device sends a request to an API endpoint based on the geospatial coordinates.

13. The method of claim 10, further comprising matching, by the computing device, a location to regulatory data using a location-based mapping module configured to:
   receive the input data objects;
   input identified geospatial coordinates of the input data objects into a location machine learning (ML) model; and
   output corresponding regulatory requirements.

14. The method of claim 10, further comprising performing, by the computing device, a course assignment function using a course assignment machine learning (ML) model configured to:
   receive the input data objects;
   receive location-specific regulatory data of a location-based mapping module; and
   classify the input data objects a to course assignment based on the location-specific regulatory data.

15. The method of claim 10, wherein modifying the GUI comprises implementing a layout algorithm, comprising at least a grid-based layout algorithm, to determine the arrangement of display elements and interactive elements of the GUI.

16. The method of claim 10, further comprising implementing, by the computing device, a notification management module configured to:
   generate a plurality of display alerts;
   employ a decision-tree algorithm to rank the plurality of display alerts; and
   display the ranked display alerts through the GUI.

17. The method of claim 10, further comprising implementing, by the computing device, an audiovisual control module configured to utilize event-driven logic to manage an activation of multimedia elements through the GUI, wherein the multimedia elements are activated in a predefined order based on user-triggered events and a location-specific relevance of content.

18. The method of claim 10, wherein the adjustment in placement of the interface components is executed through a display management system that is configured to apply function calls to toggle a visibility of interface elements, wherein the adjustments are directly controlled by event-driven logic in response to real-time user input and predefined interaction patterns.

* * * * *